May 6, 1930.  A. CROSSLEY  1,757,111
PROTECTIVE DEVICE FOR BALLOONS
Filed Jan. 17, 1922
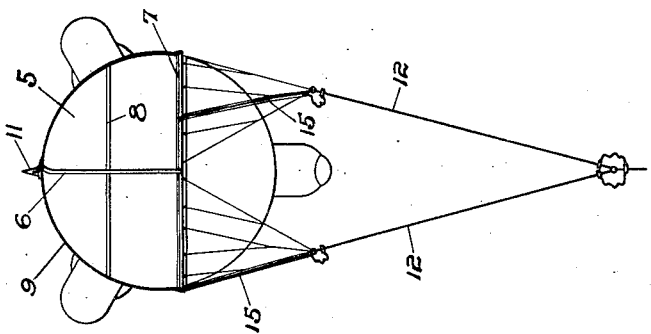
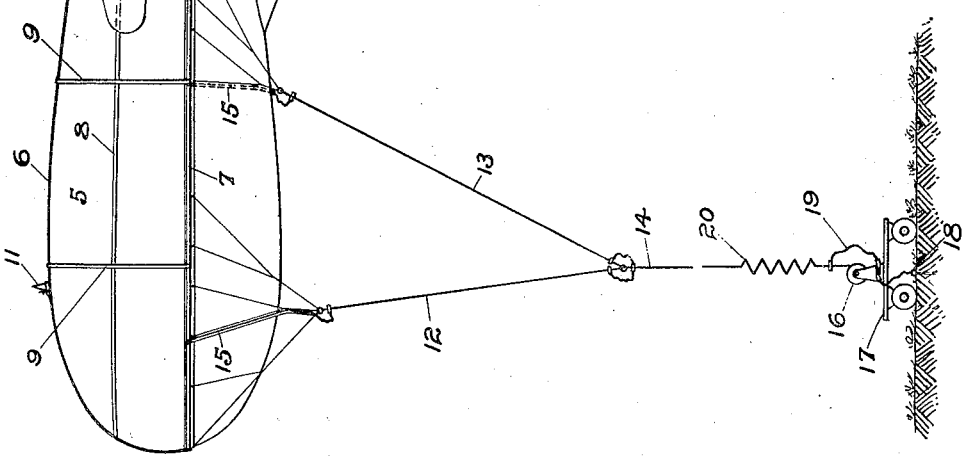
Inventor
Alfred Crossley
By
Attorney Patented May 6, 1930

1,757,111

UNITED STATES PATENT OFFICE

ALFRED CROSSLEY, OF WASHINGTON, DISTRICT OF COLUMBIA, ASSIGNOR, BY MESNE ASSIGNMENTS, TO FEDERAL TELEGRAPH COMPANY, A CORPORATION OF CALIFORNIA

PROTECTIVE DEVICE FOR BALLOONS

Application filed January 17, 1922. Serial No. 529,977.

My invention relates generally to a protective device for kite balloons, and more particularly to a lightning arrester circuit and has for an object the provision of a device to protect such balloons from the igniting effect due to the discharge of static electricity or lightning bolt within the vicinity of a balloon.

Another object of the invention is to provide a device which will to a great extent prevent lightning flashes, but if such should occur, offer a good path to ground.

A further object of the invention is to provide a device that will prevent oscillations in the lightning arrester circuit, thereby eliminating the necessity of using a conductor of unusual size, reducing to considerable extent high voltage surges in the body of the balloon, and eliminating current and voltage nodes in the cable system.

With these and other objects in view, the invention consists in the construction, combination, and arrangement of parts as will be hereinafter described.

Reference is to be had to the accompanying drawings forming part of this specification, in which like reference characters indicate corresponding parts throughout the several views, and in which Figure 1 is a side view showing my invention attached to a balloon, Fig. 2 is an end view of the same, and Fig. 3 is a detail view of the discharger.

It is a well known fact that dust or moisture bearing clouds accumulate a charge of electricity when traveling above the surface of the earth, and the strength of this charge is proportional to the distance traveled by the cloud, the speed of travel, the height of the cloud above the earth, and whether or not the cloud collides with other clouds during its course of travel which allows the taking on an additional charge when the clouds collided with are of like polarity or decreases the strength of the charge when coming in contact with clouds or objects of unlike polarity. As the speed of travel and distance traveled by the cloud can not be affected by human effort, it becomes necessary to use certain agents to counteract the charge accumulated on the cloud by neutralizing the height the cloud is from the earth and the polarity of the charge upon the cloud. Inasmuch as the earth is of different polarity to the charge accumulated on the cloud, a vertical conductor may be used to bring the earth charge to approximately the cloud potential thereby neutralizing the charge on the clouds. If the clouds carry a small or medium charge, the vertical conductor will allow these charges to become neutralized; but if a large charge is carried by the passing clouds, the air path between the tip of the vertical conductor and the next cloud will become ionized and a blue flame will be observed at the tip of the conductor, while if the charge is too great, the air path will ionize to such an extent as to form a path of low resistance over which a lightning flash will occur.

In the case of all discharges of electricity to earth, via the conductor, with the exception of the lightning flash, the conductor will be carrying an intermittent direct current charge, while in the case of lightning flash, the current flow in the conductor will be of an oscillatory nature. One of the principal objects as hereinbefore stated, is to prevent the formation of oscillations in the conductors.

Referring more particularly to the drawings, 5 indicates a balloon on which is mounted my protective device comprising the longitudinal bands 6, 7 and 8; the perpendicular bands 9; a down-haul and the discharger 11.

The bands 6, 7 and 8, preferably of flat copper braid, although other materials may be successfully utilized, extend longitudinally fore and aft at the top, about the belly, and intermediate these points respectively, while the bands 9, also of braid, extend perpendicularly between the bands 6 and 7, and connect with all three bands. These bands 9 are arranged at predetermined distances, so as to neutralize the potential differences throughout the balloon. While I prefer to secure the bands to the balloon by cementing fabric strips passing over the band to the gas bag, and to connect the bands themselves to one another by soldering, it is to be understood that any other method may be employed.

The discharger or cone 11 is secured to the band 6 at the nose, at the top or at the tail of the balloon, but it is found to be most desirable to have it arranged at the top, as shown. The discharger consists of a leather cone which has a copper tip 22 secured to the top of the cone. This tip should be so constructed as to have a sharp point, and a strip 23 of braid is made fast to the tip and connects with the braid on the body of the balloon. The cone may be secured to the balloon in many ways, the illustration given being but one method of connection which permits easy removal of the discharger should the same become damaged in any manner whatsoever.

The purpose of placing the discharger on the highest point of the balloon, and connecting it electrically with the down-haul is to remove the exposed brushing or sparking surface to a place where no fabric or gas is in the direct path between the cloud and the tip of the conductor. The difficulty experienced in the past has been due to the presence of the body of the balloon between the tip of the conductor end of steel down-haul and the passing cloud, in which exposed position an ionized air path or sparking path ignited the gas or in some cases the fabric, which in turn ignited the gas. To further explain this point, it is stated that the balloon was originally connected to the down-haul by hemp bridles, in which condition the balloon was exposed to lightning flashes that occured between the top of the down-haul and the passing cloud.

The down-haul consists of steel cables 12 and 13 and their connecting steel cable 14, the upper ends being secured in any suitable manner to strips of braid 15, depending from the longitudinal band 7. The cable 14 passes around a winch 16, mounted on a carrier 17, by which the balloon is hoisted or lowered. The cable 14 is grounded at 18 by a section of braid 19, which leads from the winch to a section of galvanized pipe when in temporary use or to radial conductors of flat copper ribbon or heavy copper wire buried a suitable distance when permanently installed.

The advantage of having direct current surges in the steel cable in preference to an oscillatory current has been hereinbefore mention. As the oscillatory current in the cable is caused by a lightning discharge, or in rare cases, by a heavy brush discharge, some means must be provided to suppress this tendency and to cause a discharge to take place in the form of a direct current in the cable.

The method I prefer to use to suppress the tendency of the cable to carry an oscillatory current is to insert a resistance in series with the down-haul. It is a well known fact that the oscillations in any circuit, containing inductance, capacity, and resistance, can be controlled or eliminated by varying the values of resistance in the circuit. A circuit having $R^2$ greater than $\frac{4L}{C}$ where R is the resistance, L the inductance, and C the capacity, will not oscillate but will give rise to a direct current surge. Working on this assumption, and having determined the inductance and capacity of the balloon and cable circuit, the proper value of resistance to be inserted in series with the cable can be easily obtained by substituting these values in the formula $R^2 \frac{4L}{C}$. The resistance to be inserted in the cable at 20 may be of any suitable high resistance material and should be capable of carrying a current of 200 amperes.

It is understood that the above description and accompanying drawings disclose only the preferred improvement of my invention and that various minor changes in details of construction, proportion, and arrangement of parts may be resorted to within the scope of the appended claims and without sacrificing any of the advantages of my invention.

Having fully described my invention and what I desire to secure by Letters Patent is:—

1. In a system for protecting kite balloons from destructive atmospheric disturbances, comprising a bridle of flexible metallic conductors for embracing said balloon, a conical shaped discharger connected to the uppermost point of said bridle and a down-lead extending from the lowermost point of said bridle and connected to ground, said down-lead being loaded with a concentrated and dissipative resistance having one end connected to said bridle and the other end connected to ground for preventing oscillatory currents which tend to flow in said bridle.

2. In a system for protecting kite balloons from destructive atmospheric disturbances, a discharger for attachment to the kite balloon, a flexible metallic bridle embracing said kite balloon and connected at one end to said discharger and a connection between the other end of said metallic bridle and the ground, and a concentrated and dissipative resistance having one end connected to said bridle and the other end connected to ground interposed in said last mentioned connection for preventing oscillatory currents therein.

3. In a system for protecting kite balloons from destructive atmospheric disturbances, a bridle of flexible metallic conductors embracing said balloon and connected at one end to ground through a high resistance and a connection between the other end of said bridle and a discharger secured to said balloon, said discharger comprising an insulated body portion and a metallic tip carried by said body portion remote from said bridle and electrically connected with said bridle, said resistance being connected to the bridle at one end and connected to ground at the other end.

4. In a system for protecting kite balloons from destructive atmospheric disturbances, a flexible metallic bridle embracing the balloon, a conical shaped discharger supported by said balloon, said discharger comprising an insulated body portion and a conical shaped metallic tip thereon electrically connected with said flexible metallic bridle and a connection between said bridle and the ground through a high concentrated resistance for preventing the setting up of oscillatory currents in said bridle.

5. In a protective system, a balloon, a bridle of conductors surrounding said balloon, a discharger comprising an insulated conical shaped member, means for securing said member at its base adjacent the top of said balloon, a metallic tip carried by said insulated conical member, a connection extending downwardly along one side of said insulated conical member and anchored thereto, said connection being connected to said bridle of conductors surrounding said balloon and a connection between said bridle and a body at substantially zero electrical potential.

ALFRED CROSSLEY.